United States Patent [19]
Morris

[11] Patent Number: 5,290,199
[45] Date of Patent: Mar. 1, 1994

[54] APPARATUS FOR DEVEINING SHRIMP

[75] Inventor: Donald R. Morris, Greenville, Tex.

[73] Assignee: Prawnto Shrimp Machine Co., Caddo Mills, Tex.

[21] Appl. No.: 53,904

[22] Filed: Apr. 26, 1993

[51] Int. Cl.⁵ .......................................... A22C 29/02
[52] U.S. Cl. ............................................ 452/3; 452/5
[58] Field of Search ................................ 452/3, 2, 5

[56] References Cited

U.S. PATENT DOCUMENTS

| | | | |
|---|---|---|---|
| 2,702,921 | 3/1955 | Pinney | 17/2 |
| 3,466,699 | 9/1969 | Willis et al. | 452/5 |
| 3,787,928 | 1/1974 | Domecki | 452/3 |
| 4,087,887 | 5/1978 | Hoffman et al. | 452/3 |
| 4,472,858 | 9/1984 | Keith | 452/3 |

FOREIGN PATENT DOCUMENTS 705138  3/1954  United Kingdom ................... 452/3

*Primary Examiner*—Willis Little
*Attorney, Agent, or Firm*—Johnson & Gibbs

[57] ABSTRACT

An apparatus for cutting and deveining shrimp comprises a motor driving means inside a housing and a cutting mechanism outside the housing. A pair of rotating flexible disks grasp shrimp bodies and propel them past a cutting disk which slices the sand vein from the back of the shrimp. An idler roller is mounted on an adjusting shaft which may be positioned to adjust the depth of cut on the shrimp. An improved adjusting mechanism and external crank arm on the adjusting shaft enables adjustment of the idler roller while completely sealing the motor housing from any debris from the cutting operation. Polyurethane flexible disks reduce the growth of surface bacteria.

10 Claims, 5 Drawing Sheets

APPARATUS FOR DEVEINING SHRIMP

BACKGROUND OF THE INVENTION

1. Field of the Invention

This invention is related to an apparatus for deveining shrimp, and, more specifically, to an apparatus for cutting the sand vein from shrimp with improved sanitation.

2. Description of Related Art

FIG. 1 is a frontal, right-side perspective view of a shrimp cutting machine from U.S. Pat. No. 2,702,921 to Pinney. In Pinney, a shrimp is fed manually into the machine 1 which holds the shrimp in a stretched out position while it is being cut lengthwise down the center of the back and subsequently cut a second time on each side of the center cut. Shown on the top of the top cover 4 are a pair of guide fingers 11 and 12 between which shrimp are placed with their back sides up, and are then pushed head-first until they come in contact with a pair of flexible rubber disks 8 and 9.

FIG. 2 is a frontal, right-side perspective view of the guide fingers 11 and 12 and the flexible rubber disks 8 and 9. The flexible rubber disks 8 and 9 rotate around an axle 10 and grasp the shrimp, pulling it into the machine.

FIG. 3 is a left side view of the interior mechanisms of the shrimp cutting machine 1. The flexible disks 8 and 9, upon pulling the shrimp into the machine, hold the shrimp against the surface of a feed drum 6. The feed drum 6 is rotated at high speed by an electric motor 5 and a drive belt 7. A chain 20 and sprockets drive the flexible disks 8 and 9, a single central cutting disk 15, and a pair of cutting disks 17 and 18.

FIG. 4 is a front view of the interior mechanisms of the shrimp cutting machine 1, showing more definitively the positioning of the flexible disks 8 and 9, the single cutting disk 15, and the pair of cutting disks 17 and 18.

In operation, each shrimp is individually fed into the machine by hand, head first, between the guide fingers 11 and 12. As the shrimp engages the flexible rubber disks 8 and 9, which are revolving at a high rate of speed, the shrimp is drawn downwardly around the periphery of the feed drum 6. The bottom of the shrimp is pressed against the feed drum 6, thus supporting the shrimp on the bottom and also holding each shrimp in proper position so that the cutting disk 15 can cut the shrimp longitudinally down the center of the back.

The shrimp continues to follow the periphery of the feed drum 6 and is carried past the revolving pair of cutting disks 17 and 18 which cut the shell structure on each side of the center cut previously made by the single cutting disk 15. The shrimp is then ejected from the bottom of the machine 1. The sand vein found in the back of the shrimp is cut by the single cutting disk 15, and when the second pair of disks 17 and 18 come into action, the sand vein is automatically discharged from the body of the shrimp.

As is readily apparent from FIGS. 3 and 4, the machine disclosed in U.S. Pat. No. 2,702,921 is quite complex, and this complexity makes it susceptible to mechanical breakdown. In addition, the placement of the electric motor 5 and the chain and sprocket drive mechanism used to drive the drum 6, flexible disks 8 and 9, and cutting disks 15, 17 and 18 makes this machine extremely difficult, if not impossible, to keep in a clean and sanitary condition. As the shrimp is cut, the sand vein is stripped away, and flying debris and bodily fluids from the shrimp cover the inner workings of the machine. It must be frequently disassembled, cleaned and sanitized to keep the machine in sanitary working condition.

An improvement to the machine disclosed in U.S. Pat. No. 2,702,921 was made when it was discovered that the secondary cuts performed by the pair of cutting disks 17 and 18 were unnecessary in the process of deveining and deshelling the shrimp. A redesign of the machine was undertaken, with the secondary blades removed for simplification. Additionally, it was attempted to isolate the electric motor and drive mechanism from the flying shrimp debris resulting from the cutting process. The motor and drive mechanism was placed inside a housing while a pair of flexible rubber disks and a cutting disk were mounted outside the housing and covered with a protective shield.

FIG. 5 is a frontal, left-side perspective view of a prior art shrimp deveining apparatus with an external cutting mechanism covered by shield 55, and an internal motor and drive mechanism within a housing 44 (shown in phantom). An electric motor 31 turns a drive belt 32 which in turn drives two parallel shafts, an upper shaft 33 and a lower shaft 34. The shafts extend through openings in a circular housing plate 35.

FIG. 6 is a frontal, right-side perspective view of the prior art shrimp deveining apparatus of FIG. 5, with the protective shield 55 removed. It can be seen that a pair of flexible rubber disks 36 and 37, similar to flexible disks 8 and 9 in FIGS. 1–4, are mounted near the end of the upper shaft 33. A single cutting disk 38 is mounted near the end of the lower shaft 34. An adjusting shaft 39 extends through a slot 41 in the circular housing plate 35 and has a rubber idler roller 42 mounted near its outside end. The idler roller 42 freewheels on the adjusting shaft 39, and is held in position by a rubber disk 43 on each side.

During operation, the flexible rubber disks 36 and 37, the cutting disk 38, and the adjusting shaft 39 and idler roller 42 are covered with the protective shield 55. The shield 55 slidably mounts on the circular housing plate 35. Shrimp are placed through a small opening 56 in the top of the shield 55, and exit through a large opening 57 in the bottom of the shield 55.

Referring again to FIG. 5, the inside end of the adjusting shaft 39, i.e., the end which is inside housing 44, is mounted with a set screw 45 to an L-shaped arm 46 which is mounted at a pivot point 47 on the frame 48 of the housing 44 above the upper shaft 33. One end of an adjusting rod 49 is mounted at the other end of the L-shaped arm 46. The adjusting rod 49 extends diagonally through the housing 44 and exits through a flexible mount 50 extending through an opening in the front side 51 of the housing 44. The external end 52 of the adjusting rod 49 is threaded, and an adjusting knob 53 is mounted thereon. By rotating the adjusting knob 53, the adjusting rod 49 may be extended or retracted from the housing 44, thereby rotating the L-shaped arm 46 about its pivot point 47. This rotation causes an arcuate change of position of the adjusting shaft 39 as it extends through the slot 41 in the circular housing plate 35. This causes the adjusting shaft 39 and the idler roller 42 mounted thereon to move closer to or, if rotated the opposite direction, farther away from the cutting disk 38.

Although this machine is a significant improvement over the original design disclosed in U.S. Pat. No. 2,702,921, it still has a serious sanitation problem. A considerable amount of fluid, shrimp veins, and pieces of shrimp shell are disbursed within the shield 55 during operation of the machine. The slot 41 in the circular housing plate 35, through which the adjusting shaft 39 extends, allows a significant portion of this material to pass through the circular housing plate 35 and into the motor housing 44. This creates unsanitary conditions which are unsatisfactory from a health standpoint. It has been attempted to block the entry of debris into the housing 44 by placing a rubber disk (not shown) over the adjusting shaft 39 adjacent to the circular end plate 35. However, this technique has not been successful in totally eliminating the entry of debris into the housing 44.

Additionally, the flexible disks 36 and 37 have previously been made of rubber. However, the surfaces of disks made of rubber are porous, and are susceptible to growths of microscopic bacteria. Rubber disks, therefore, will not be approved for commercial food-preparation activities by governmental inspection agencies.

A shrimp deveining machine is needed which rapidly and efficiently deveins shrimp while maintaining government-approved sanitary conditions. This requires completely preventing the entry into the motor housing of any of the debris from the cutting and deveining process, and the incorporation of new flexible disks made of elastomeric material with acceptably low porosity. It is an object of the present invention to provide such a shrimp deveining machine.

SUMMARY OF THE INVENTION

The present invention is an apparatus for deveining shrimp. The apparatus has a motor within a housing and a means connected to the motor and external to the housing for gripping and propelling the shrimp past a means for cutting the sand vein from the shrimp. There is a means for adjusting the position of the cutting means in relation to the shrimp which includes means for preventing debris from the cut shrimp from entering the motor housing. The adjusting means may be a rotating adjusting shaft, and the means for preventing debris from entering the motor housing may be a sealed journal supporting the adjusting shaft.

BRIEF DESCRIPTION OF THE DRAWING

The invention will be better understood and its numerous objects and advantages will become more apparent to those skilled in the art by reference to the following drawing, in conjunction with the accompanying specification, in which.

DETAILED DESCRIPTION

Figure 1:
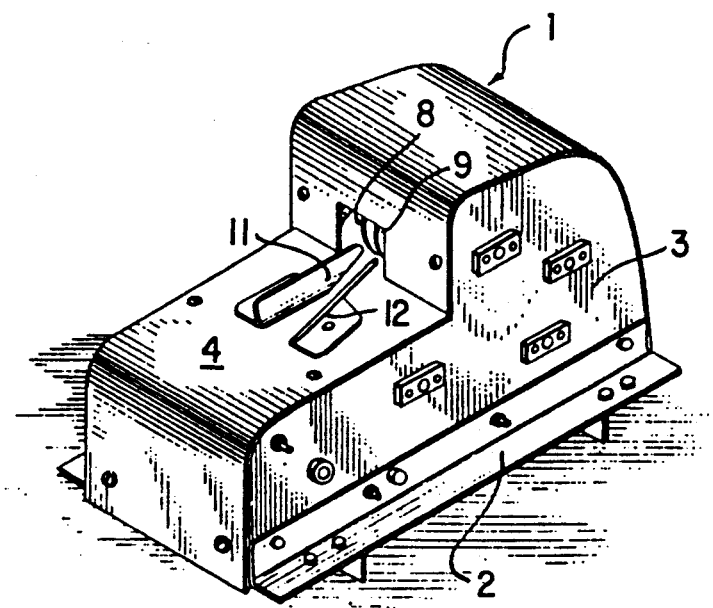
FIG. 1 (Prior art) is a frontal, right-side perspective view of a prior art shrimp cutting machine.
Figure 2:
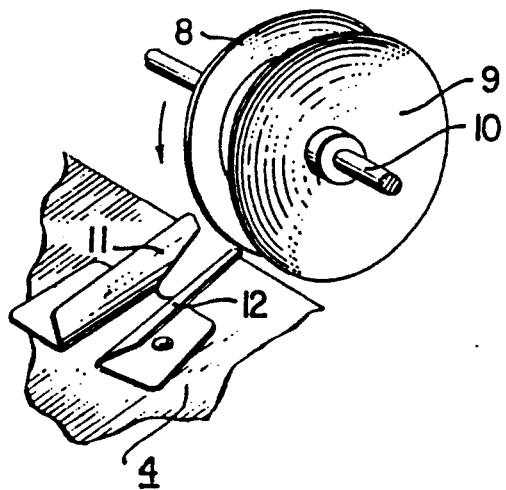
FIG. 2 (Prior art) is a frontal, right-side perspective view of a pair of guide fingers and flexible rubber disks used to position and grasp shrimp in the prior art shrimp cutting machine of FIG. 1.
Figure 3:
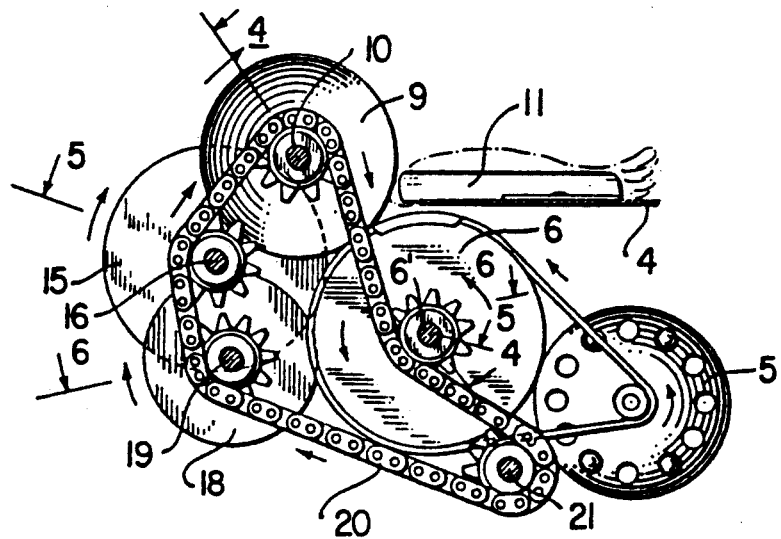
FIG. 3 (Prior art) is a left side view of the interior mechanisms of the shrimp cutting machine of FIGS. 1-2.
Figure 4:
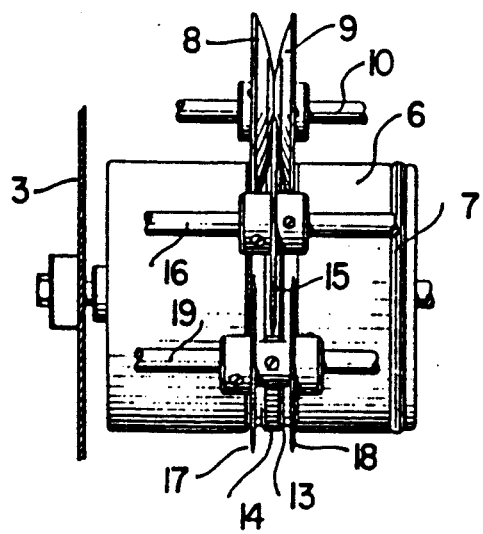
FIG. 4 (Prior art) is a front view of the interior mechanisms of the shrimp cutting machine of FIGS. 1-3.
Figure 5:
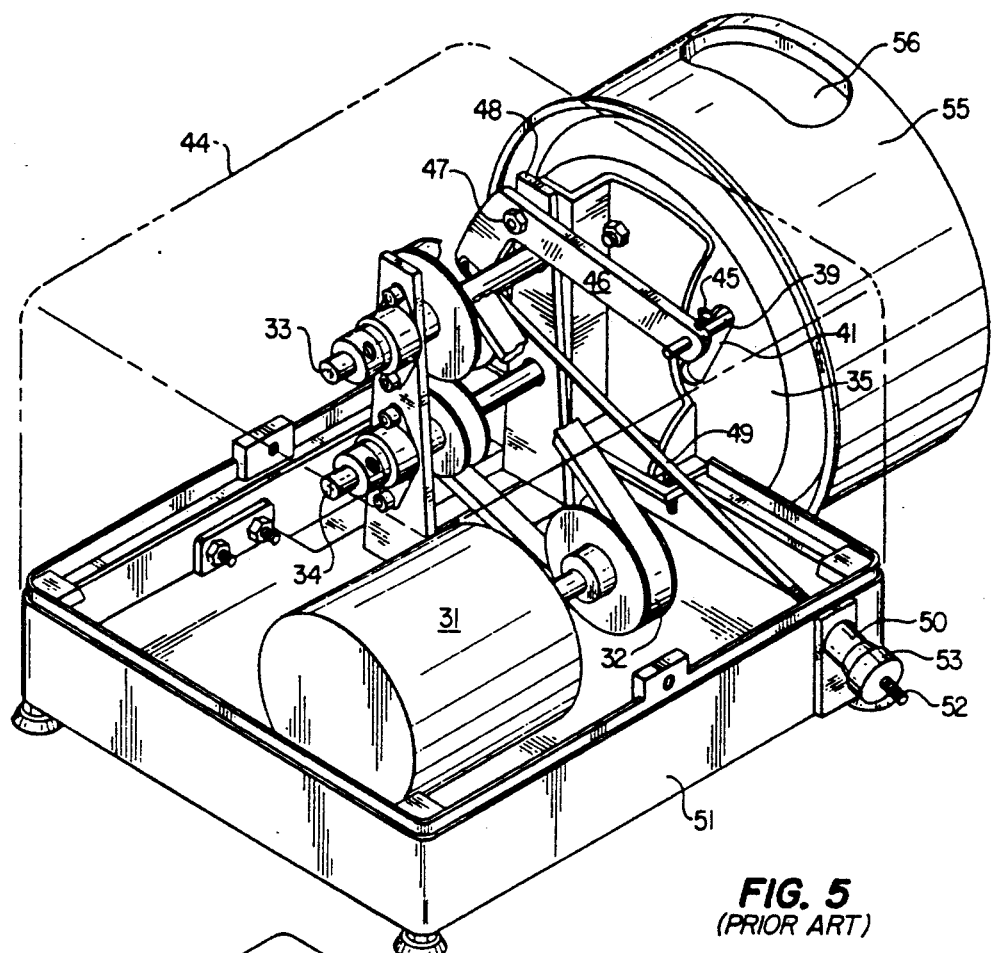
FIG. 5 (Prior art) is a frontal, left-side perspective view of a second prior art shrimp deveining device with an external cutting mechanism and an internal motor and drive mechanism, and with a motor housing shown in phantom.
Figure 6:
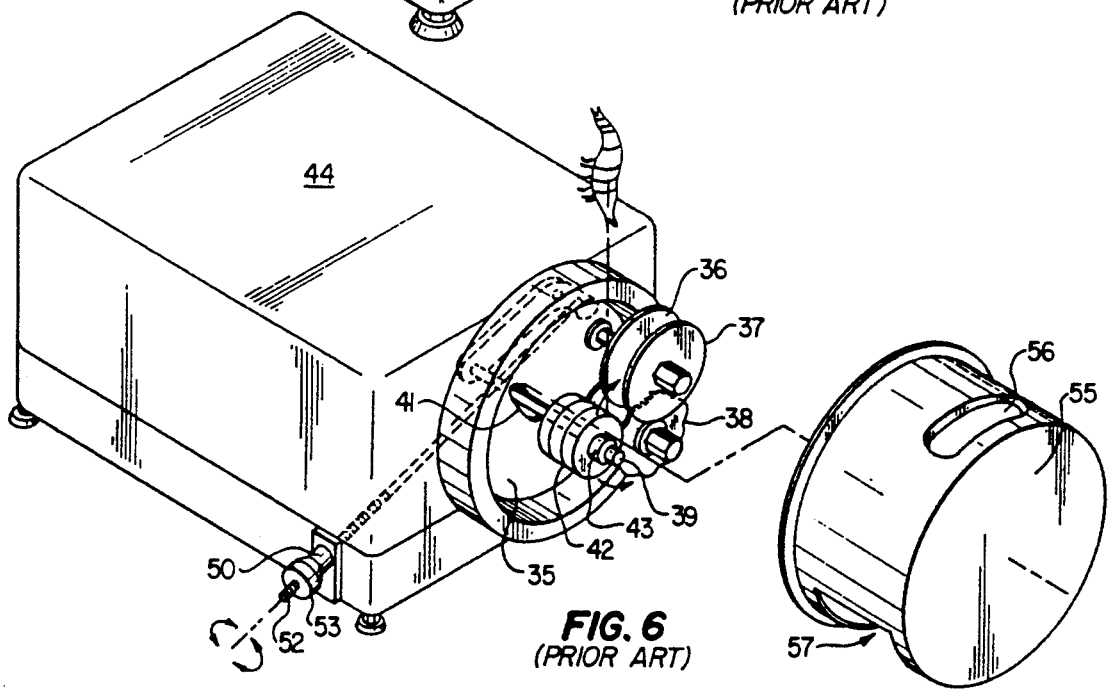
FIG. 6 (Prior art) is a frontal, right-side perspective view of the prior art shrimp deveining apparatus of FIG. 5, and with a protective shield removed.
Figure 7:
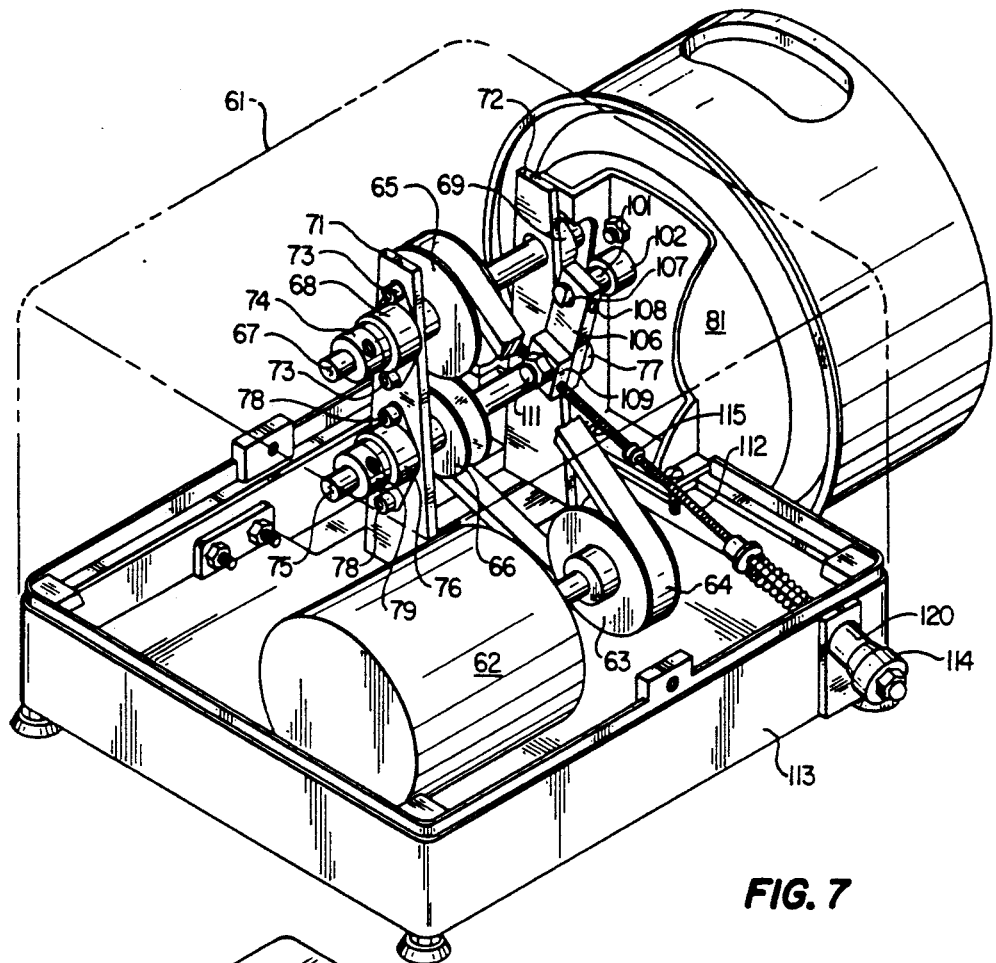
FIG. 7 is a frontal, left-side perspective view of the preferred embodiment of the shrimp deveining apparatus of the present invention.

FIG. 7 is a frontal, left-side perspective view of the preferred embodiment of the shrimp deveining apparatus of the present invention. The apparatus has a housing 61 which contains a driving means which may comprise an electric motor 62, motor pulley 63, drive belt 64, upper pulley 65, and lower pulley 66. The upper pulley 65 is mounted on an upper shaft 67 which is supported by bearings 68 and 69. The bearings 68 and 69 are mounted to vertical struts 71 and 72 by screws 73. The upper shaft 67 is prevented from sliding along its longitudinal axis by a combination bushing and set screw 74.

The lower pulley 66 is mounted on a lower shaft 75 which is supported by bearings 76 and 77. The bearings 76 and 77 are mounted to vertical struts 71 and 72 directly below the upper shaft 67 by screws 78. The lower shaft 75 is prevented from sliding along its longitudinal axis by a combination bushing and set screw 79.

The upper shaft 67 and lower shaft 75 extend through apertures in a circular housing plate 81 mounted on the side of the housing 61. Elastomeric seals 82 and 83 provide a water-tight seal between the upper shaft 67 and the circular housing plate 81, and between the lower shaft 75 and the circular housing plate 81.

Figure 8:
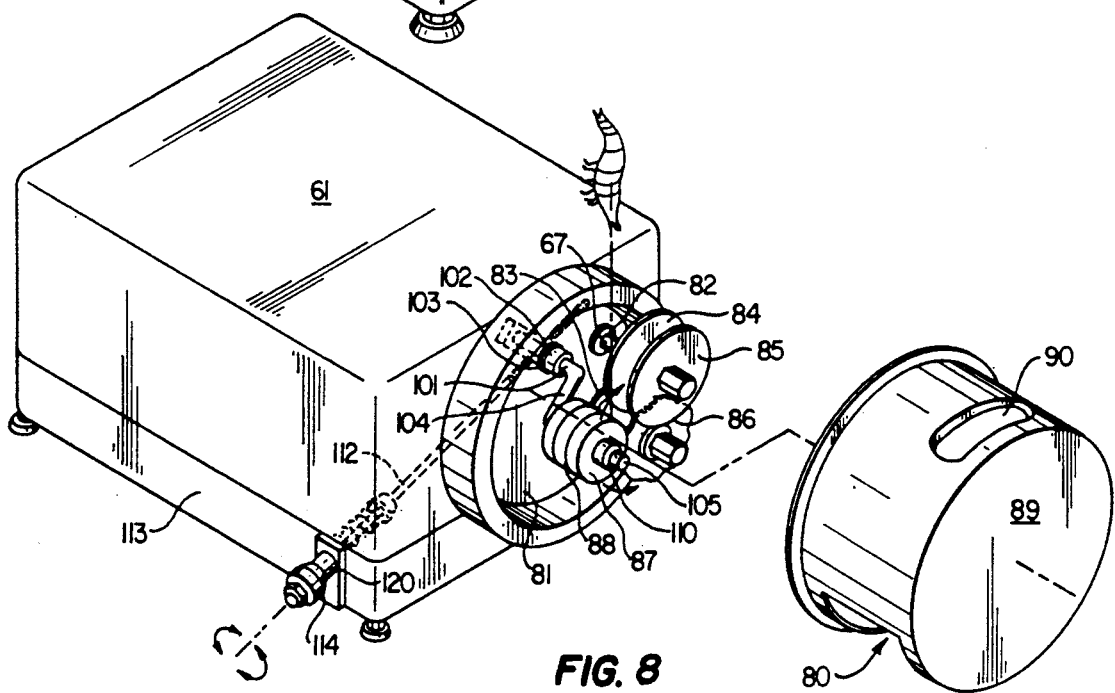
FIG. 8 is a frontal, right-side perspective view of the preferred embodiment of the shrimp deveining apparatus of the present invention showing a cutting mechanism mounted on the exterior of the motor housing.

FIG. 8 is a frontal, right-side perspective view of the preferred embodiment of the present invention showing a cutting mechanism mounted on the exterior of the motor housing 61. Flexible disks 84 and 85 are mounted near the end of the upper shaft 67. The flexible disks 84 and 85 are constructed of an elastomeric material which may be, for example, a polyurethane formulation developed by Uniroyal Corporation and molded into disks by Bailey Parks Company.

Figure 9:
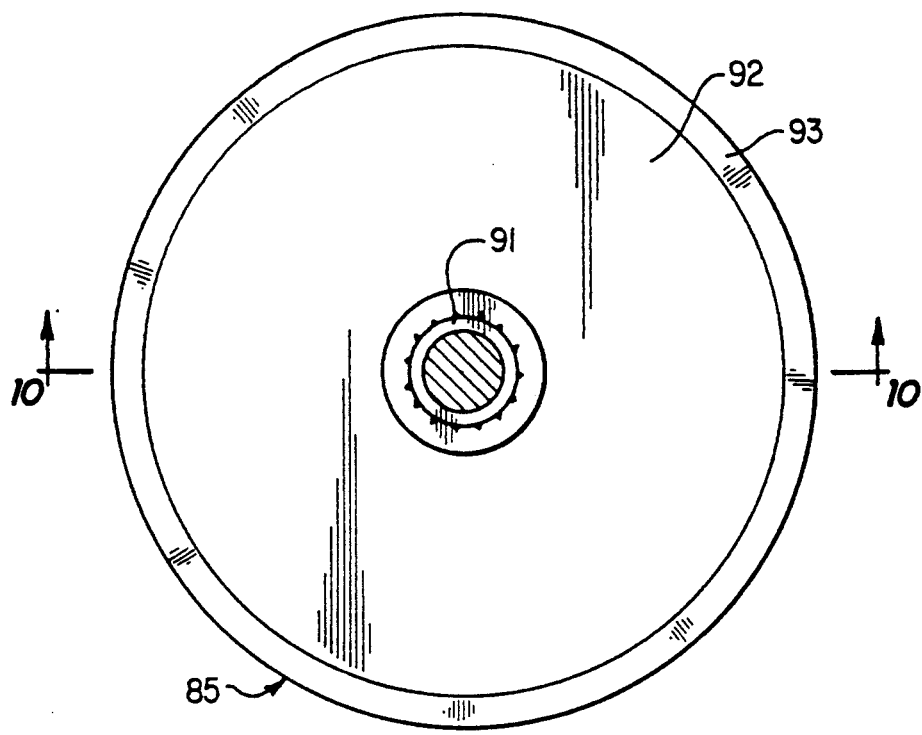
FIG. 9 is a left side elevational view of a pair of flexible disks mounted on the upper shaft in the preferred embodiment of the present invention.

FIG. 9 is a left side elevational view of the pair of flexible disks 84 and 85 mounted on the upper shaft 67 in the preferred embodiment of the present invention. A knurled insert 91, which may be, for example, rubber, fits tightly around the upper shaft 67. Each flexible disk 84 and 85 fits tightly around the knurled insert 91 and is caused thereby to rotate with the upper shaft 67.

Figure 10:
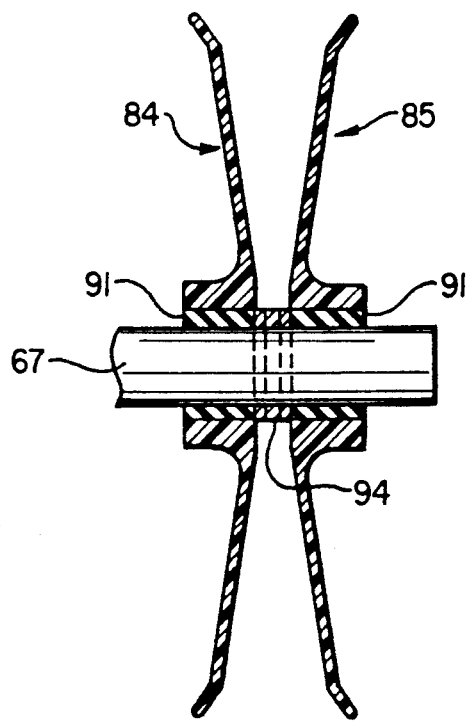
FIG. 10 is a cross sectional view of a pair of flexible disks, taken along the line 10—10 of FIG. 9.

FIG. 10 is a cross sectional view of the pair of flexible disks 84 and 85, taken along the line 10—10 of FIG. 9. The main body 92 of the disks has the proper degree of flexibility and rigidity to properly grasp and propel shrimp through the cutting mechanism. The main body 92 may be constructed of polyurethane of a thickness of approximately 0.04 inches, and may be angled off of the vertical by approximately 8.0 degrees. An outer section 93 of the disks may be angled off the vertical approximately 35 degrees. As shown in FIG. 10, the angling of the main body 92 and the outer section 93 of each flexible disk 84 and 85 creates a divergent region between the disks which is suitable for the placement of shrimp. Stainless steel spacer washers 94 may be placed on the upper shaft 67 between the flexible disks 84 and 85 to adjust the size of the region between the disks to accomodate different sizes of shrimp.

Referring again to FIG. 7, the drive belt 64 from the motor 62 engages pulleys 65 and 66 mounted on the upper and lower parallel shafts, respectfully. The pulley 65, mounted on the upper shaft 67, has a larger diameter than pulley 66, mounted on the lower shaft 75. Therefore, for a given motor speed, the upper shaft 67, which has the flexible disks 84 and 85 mounted on the outside end thereof, rotates at a lower RPM than the lower shaft 75, which has the cutting disk 86 mounted near the outside end thereof. Thus, the cutting disk 86 turns at a higher rate of rotation than the flexible disks 84 and 85 mounted thereabove. Thus when the flexible disks 84 and 85 pull the shrimp downward into contact with the cutting disk 86, the edge of the cutting disk 86 is moving downward at a higher rate of speed than the shrimp, and therefore, makes a clean cut in the back of the shrimp.

An adjusting shaft 101 extends through an aperture in the circular housing plate 81, where it is journalled by a bearing 102. In FIG. 8, it can be seen that an elastomeric seal 103 provides a water-tight seal between the bearing 102 and its journal, thereby completely preventing any debris from the shrimp-cutting operation from entering the motor housing 61.

Still referring to FIG. 8, it can be seen that the exterior portion of the adjusting shaft 101 has two equal-but-opposite bends in it to form a crank-arm 104. A parallel portion 105 of the adjusting shaft 101 is thereby created which is offset from the axis of rotation of the adjusting shaft 101.

An idler roller 87 is mounted near the external end of the parallel portion 105 of the adjusting shaft 101. In the preferred embodiment, the idler roller 87 is a three-inch diameter roller which may be made of, for example, a hard polycarbonate material which freewheels on a small bronze bearing 110. The idler roller 87 has a groove 88 in the center, which allows the cutting mechanism to be set such that the machine cuts the shrimp into two pieces rather than merely deveining the shrimp.

Referring again to FIG. 7, it can be seen that one end of a lever arm 106 is mounted to a flatened interior end 107 of the adjusting shaft 101 with a set screw 108 which causes the lever arm to rotate with the adjusting shaft 101. At the other end of the lever arm 106, a block 109 is mounted with a bolt 111. The block 109 is free to rotate about the bolt 111. The block is threadably mounted to an adjusting rod 112 which extends diagonally through the motor housing 61 and exits through a flexible support 120 mounted in an aperture in the front side 113 of the motor housing 61. An adjusting knob 114 is mounted on the exterior end of the adjusting rod 112, and is used to rotate the adjusting rod. Rotation of the adjusting rod 112 causes the block 109 to translate along the adjusting rod, thereby rotating the lever arm 106 through an arcuate distance. The range of motion of the block 109 along the adjusting rod 112 is limited in each direction by adjustable stop-collars 115.

Rotation of the lever arm 106, in turn, causes rotation of the adjusting shaft 101 as it passes through bearing 102. As seen in FIG. 8, rotation of the adjusting shaft 101 sweeps the crank arm 104 and parallel section 105 through an arcuate change of position, thereby moving the idler roller 87 closer to or farther away from the cutting disk 86. In this manner, the depth of cut made on the shrimp may be adjusted, while simultaneously preventing debris from the cutting operation from entering the motor housing 61. A stop collar (not shown) at the interior end of the adjusting rod 112 (FIG. 7) prevents the operator from adjusting the idler roller 87 to the point that it contacts the cutting disk 86.

Still referring to FIG. 8, a protective shield 89 may be slidably engaged over the circular housing plate 81 for safety protection from the cutting disk 86. The shield 89 also serves to retain flying debris which is created by the high speed cutting disk 86 as it cuts the vein from the shrimp.

In operation, shrimp are manually fed into the apparatus 60 through the small opening 90 in the top of the protective shield 89, between the idler roller 87 and the flexible disks 84 and 85. The shrimp are placed head first into the apparatus with the backside being engaged by the flexible disks 84 and 85 and the front side of the shrimp being in contact with the idler roller 87. The flexible disks 84 and 85 spread under pressure so as to grip various-sized shrimp as they enter the apparatus. The shrimp are quickly drawn through the apparatus by the rotating flexible disks 84 and 85 which are rotated at high speed by the electric motor 62. The rotating cutting disk 86 cuts the vein from the shrimp and the deveined shrimp falls through a large opening 80 in the bottom of the shield 89 into a holding container (not shown).

Thus, there has been described and illustrated herein, the preferred embodiment of an improved shrimp deveining apparatus. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. In an apparatus for deveining shrimp of the type having a housing, a motor within said housing, means external to said housing for gripping and propelling said shrimp, means external to said housing and adjacent said gripping and propelling means for cutting the sand vein from said shrimp, and means for adjusting the position of said cutting means in relation to said shrimp, the improvement wherein:

said a rotating shaft and a sealed journal supporting shaft for adjusting said cutting means in relation to said shrimp includes means for preventing debris from said shrimp from entering said housing.

2. The apparatus for deveining shrimp of claim 1 wherein said means for gripping and propelling said shrimp includes a pair of flexible polyurethane disks.

3. An apparatus for deveining shrimp comprising:
    a housing;
    a vertical housing plate having three apertures therein mounted at one end of said housing;
    a motor mounted inside said housing;
    a first drive shaft extending horizontally through the first aperture in said housing plate;

a second drive shaft extending horizontally through the second aperture in said housing plate and mounted below said first drive shaft;

drive means connecting said motor to said first and second drive shafts for rotating said shafts;

means mounted on said first drive shaft for gripping and propelling shrimp bodies;

means mounted on said second drive shaft and positioned below said gripping and propelling means for cutting the sand vein from said shrimp bodies;

an adjusting shaft extending horizontally through a third aperture in said housing plate for adjusting the position of said shrimp bodies in relation to said cutting means, said adjusting shaft having two equal-but-opposite bends external to said housing, said bends creating a portion of said adjusting shaft which is parallel to, and offset from, the axis of rotation of said adjusting shaft; and means connected to said adjusting shaft for rotating said shaft from within said housing.

4. The apparatus of claim 3 wherein said motor is an electric motor.

5. The apparatus of claim 4 wherein said drive means connecting said motor to said first and second drive shafts includes a drive belt which engages a first pulley mounted on said first drive shaft and a second pulley mounted on said second drive shaft.

6. The apparatus of claim 5 wherein said first pulley is of larger diameter than said second pulley, thereby imparting a lower rate of rotation to said first drive shaft than to said second drive shaft.

7. The apparatus of claim 6 wherein said means for gripping and propelling shrimp bodies includes a pair of flexible disks mounted on said first drive shaft and separated by the approximate width of one shrimp body.

8. The apparatus of claim 7 wherein said pair of flexible disks is a pair of polyurethane disks.

9. The apparatus of claim 8 wherein said means for cutting the sand vein from said shrimp bodies includes a cutting disk mounted on said second drive shaft and longitudinally positioned on said second drive shaft such that said cutting disk is halfway between said pair of flexible disks on said first drive shaft.

10. The apparatus of claim 9 wherein said means for rotating said adjusting shaft from within said housing includes;

a lever arm having first and second ends, said first end being attached to said adjusting shaft;

a rotating block attached to said second end of said lever arm;

an adjusting rod having first and second ends, said first end being threadably mounted to said rotating block; and an adjusting knob mounted on said second end of said adjusting rod for manually rotating said rod, thereby translating said block and said lever arm along said adjusting rod and rotating said adjusting shaft.

* * * * *